Feb. 27, 1962     O. J. STEMEN     3,022,778
ALTERNATOR MOUNT FOR DIESEL ENGINES
Filed Jan. 31, 1961     2 Sheets-Sheet 1

INVENTOR.
Orie J. Stemen
BY WHITEHEAD, VOGL & LOWE
PER *Frank C. Lowe*
ATTORNEYS Feb. 27, 1962     O. J. STEMEN     3,022,778
ALTERNATOR MOUNT FOR DIESEL ENGINES
Filed Jan. 31, 1961     2 Sheets-Sheet 2

INVENTOR.
Orie J. Stemen
BY WHITEHEAD, VOGL & LOWE
PER Frank C. Lowe
ATTORNEYS

United States Patent Office 3,022,778
Patented Feb. 27, 1962

3,022,778
ALTERNATOR MOUNT FOR DIESEL ENGINES
Orie J. Stemen, 2150 S. Galapago St., Denver, Colo.
Filed Jan. 31, 1961, Ser. No. 86,027
7 Claims. (Cl. 123—195)

This invention relates to diesel engines for trucks and tractors, and more particularly to the electrical generators therefor and to means for mounting improved types of generators on the engines.

A generator is needed on a diesel truck engine for producing auxiliary power to charge the storage batteries and furnish electrical energy for truck lighting and the like. In the past the standard and almost universal type of generator for diesel engines was a direct current unit capable of generating electricity at a selected voltage, usually 12 or 24 volts. However, direct current generators have been unsatisfactory in several respects. For example, when the diesel engine of a truck is running at low speed or at idling speeds and when the truck lighting system is on, the generator does not function and there is an excessive drain on the storage batteries.

For this, and other reasons, there has been developed an alternating current generator, called an alternator, of a type which generates both direct current and alternating current and which possesses marked advantages over the old type direct current generators. Such advantages need not be further elaborated on herein. It is sufficient to state that alternators may now be provided as optional equipment on diesel truck engines and particularly on Cummins diesel engines, a well known make which is used in many trucks and tractors throughout the country. Also, that alternators are being enthusiastically accepted by many truck users.

This has resulted in inquiry as to the practicability of installing alternators in the many diesel powered trucks now in use throughout the country. However, it was discovered that mere substitution of the alternator for the generator was not practical and this was especially so on Cummins diesel truck engines where the generator was direct-connected to gear mechanisms within the engine. To operate the old style direct current generator properly, the drive mechanism is geared to rotate it about 500 r.p.m. when the engine is idling. To operate an alternator properly the drive mechanism must be geared to rotate it approximately 900 r.p.m. when the engine is idling. A gear change within the diesel engine to do this would be entirely too expensive for the results obtained. Moreover, it appeared that any other method of mounting the alternator on the engine and the necessary additional arrangements for changing the speed of rotation were out of the question because of the space limitations, especially when the motor was set within the framework of the truck or tractor body.

It was with such considerations in view that the present invention was conceived and developed. The invention comprises, in essence, a mounting and belting assembly which is especially adapted to permit installation of an alternator on a diesel truck engine and especially on a Cummins-type engine which would replace the direct current generator furnished with that engine. In this connection, it is to be emphasized that an individual diesel truck engine will be used for several years before it is replaced by a newer model having an alternator as standard equipment. Thus, a complete change-over to the point where the invention is not needed will require a number of years.

It follows that a primary object of the invention is to provide a novel and improved mounting assembly for mounting an alternator on a diesel truck engine and especially on a Cummins diesel engine. Accordingly, the invention will be hereinafter described with respect to a Cummins engine, although it will be referred to simply as a "diesel engine" or "engine."

Another object of the invention is to provide a novel and improved mounting assembly for mounting an alternator on a truck engine which permits the alternator to be easily installed without any time-consuming and expensive modifications to the engine.

A further object of the invention is to provide a novel and improved mounting bracket for mounting an alternator on a diesel engine which will make use of the available tapped mounting lugs and other tapped holes in the body of the engine for attachment of the bracket to the body.

A further object of the invention is to provide a novel and improved mounting assembly for mounting an alternator onto a diesel truck engine which will hold the alternator snugly against the sidewall of the engine and out of the way of the structural members of the truck which are adjacent to the engine.

Yet other objects of the invention are to provide an assembly, including an improved mounting bracket and drive-connecting elements for mounting an alternator onto a diesel engine which is simple, neat, economical, rugged and durable and may be provided to the trade as a compact kit for use whenever a change-over is desired.

With the foregoing and other objects in view, all of which more fully hereinafter appear, my invention comprises certain novel and improved constructions, combinations and arrangements of parts and elements as hereinafter described, defined in the appended claims and illustrated in the accompanying drawing, in which:

FIGURE 1 is a fragmentary perspective view of the side of a diesel engine and of portions of a truck supporting and embracing the engine, the figure illustrating specifically, the side of the motor where the generator is located, but with the old-model direct-current generator and other parts being removed, preliminary to installing an alternator, and with the portions of the truck frame being broken away to show parts otherwise hidden from view.

Figures 1, 2:
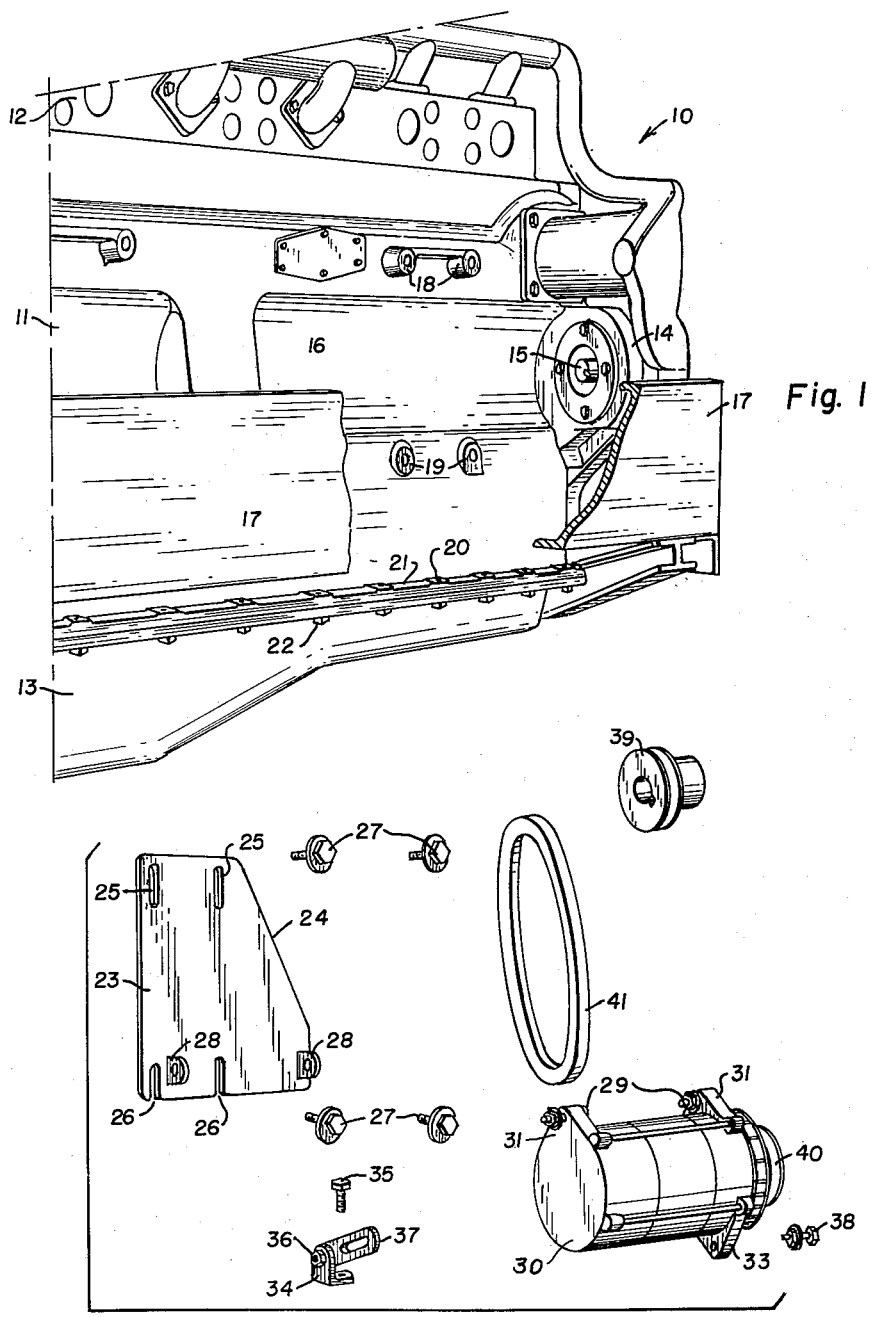
FIGURE 2 is a perspective view of an alternator and a perspective exploded view of the elements constituting the improved mounting and belting assembly which is needed to properly mount the alternator upon the engine.

Referring more particularly to the drawing, the diesel engine 10 illustrated is typical of the type which is ordinarily used for driving trucks and tractors. The various parts of the engine are attached to the block 11 and the block is topped by a head 12 while the crankcase portion of the block is covered by the oil pan 13 below it. Also, the block carries a housing 14 at the front of the engine wherein a train of gears is located for timing and driving the cams of the engine. This housing 14 also projects from the right side of the engine block 11 to carry a generator drive shaft 15. The drive shaft 15 is located alongside the block 11 at the section below the water jacket area and above the crankcase area where a channel-like recess 16 is formed. To take advantage of this construction in mounting a direct current generator thereon and to save space, a cradle-like bracket, not shown, is conventionally mounted at the side of the engine to hold the direct current generator, not shown, at this recess. The direct current generator is thus held by such a bracket in proper alignment for connection with the drive shaft 15 by a conventional type of coupling, also not shown.

In attempting to modify this arrangement for an alternator, it was discovered that the frame members of most trucks and tractors would interfere with convenient positioning of the alternator. In the first place, it is necessary to connect the shaft 15 with a speed increaser and the alternator must be suitably anchored to the body of the engine at a location other than in the recess 16. The frame members of a truck which form the engine compartment consist of transverse and longitudinally disposed components and include the main channel-like longitudinally disposed body members 17. These members lie alongside the block of the engine and the right hand member 17 is quite close to the generator position at the side of the block 11. Since the alternator cannot be placed in the recess 16, it appeared that it would be so close to the beam that it would strike the top flange of the frame member 17 especially when the engine was running under the changing loads.

It was ascertained, however, that if the alternator could be located alongside the engine block at a position substantially below the generator drive shaft and between the flanges of the channel-shaped members 17 there would be sufficient space for holding it. However, there were no facilities for mounting an alternator in this region of the motor block and it was desirable to use the mounting facilities already available on the engine block. Such included a pair of upper tapped mounting lugs 18 which were located on the block 11 above the recess 16 and a pair of lower tapped mounting lugs 19 on the block immediately below the recess. Also, another connection point or points which could be used for mounting purposes included the tapped orifices 20 in the base flange 21 at the bottom of the engine block where the rim edge of the pan 12 was connected, as by bolts 22.

To meet the conditions so imposed, a flat plate-like mounting bracket 23 is used which is adjustably affixed to the block 11 by bolting it against the upper and lower mounting lugs 18 and 19. This bracket holds the alternator at a selected position below the upper flange of the body channel 17. The bracket plate may be in the general form of a rectangular plate or a trapezoidal plate with a sloping side 24 to eliminate excess material at a corner thereof. To provide for vertical adjustment, a pair of vertically disposed slots 25 is located near the upper edge of the plate and these slots are spaced apart laterally to register with the upper mounting lugs 18. A pair of similar vertically-disposed slots 26 is located at the lower edge of the plate, which are spaced laterally to register with the lower mounting lugs 19. These slots 26 are open at the bottom edge of the plate, to permit the plate to be slipped into position upon bolts 27 turned partway into the lower mounting lugs 19.

Suitable bolts 27 are provided for both the upper and lower mounting lugs. One pair of bolts 27 may be turned partway into the lower mounting lugs 19 so that the plate may be slipped into position with the bolts moving into the slots 26. When so positioned, another pair of bolts 27 may then be extended through the slots 25 and turned into the threaded sockets in the lugs 18. The mounting bracket may be shifted vertically with the bolts in the upper and lower slots 25 and 26 and when a desired position is obtained the bolts 27 may be tightened to hold the bracket securely in place.

The width of the base of the bracket is such that the plate may carry a pair of outstanding bearing ears 28 adjacent to its lower edge which are spaced apart sufficiently to lie snugly between mounting flanges of an alternator. The bearing ears include suitable horizontally-disposed, axially-aligned orifices in them through which mounting bolts 29 may be passed to secure the alternator thereto at the selected position substantially below the location of the generator drive shaft 15.

The alternator 30 is a cylindrical generator unit substantially the same size as the direct current generator which it replaces. The cylindrical body of the alternator includes a cap member at each end which is held against the body of the member in a conventional manner and these ends outstand from one side of the alternator to form a pair of mounting flanges 31 having orifices therethrough which are in a common axial alignment. The alternator also includes a shaft 32 which outstands from one end thereof to carry a pulley as hereinafter described, and an adjuster flange 33 is located at this end of the alternator in a position which is substantially diametrically opposite to that of the mounting flanges. The alternator also includes other conventional electrical connections which are not shown herein.

Figure 3:
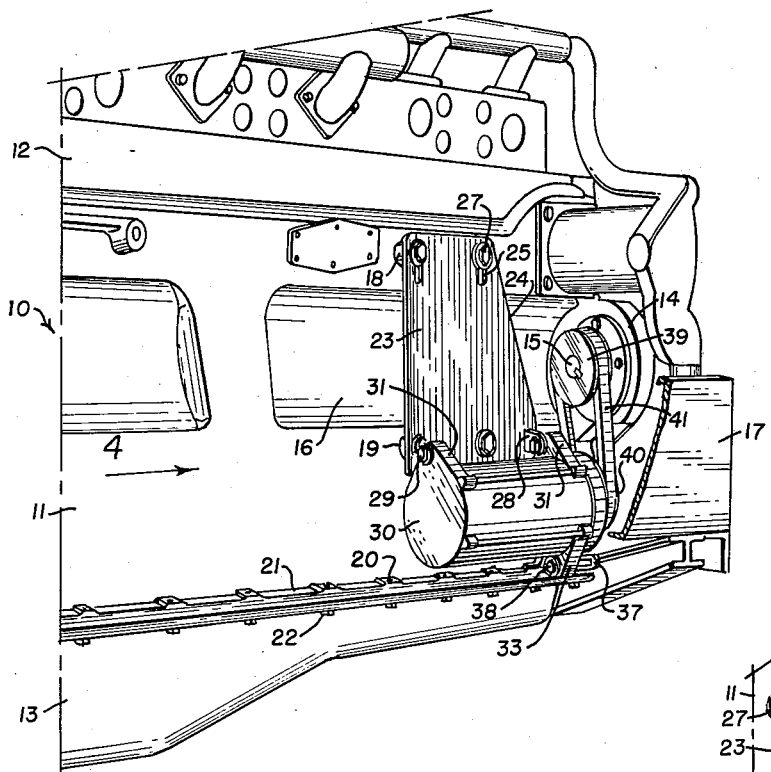
FIGURE 3 is a perspective view similar to FIG. 1, but illustrating the assembly as being mounted upon the engine and the alternator as being mounted upon the bracket element of the assembly and as being operatively connected to the engine.
Figure 4:
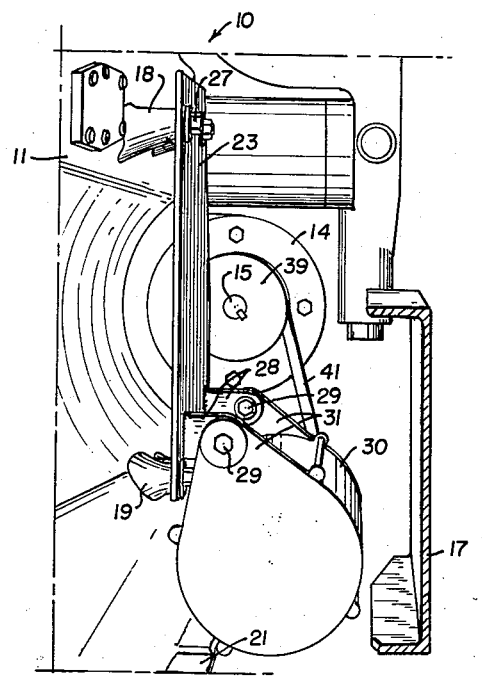
FIGURE 4 is a fragmentary persective view of the arrangement illustrated at FIG. 3 and as viewed substantially from the indicated arrow 4 at FIG. 3.
Figure 5:
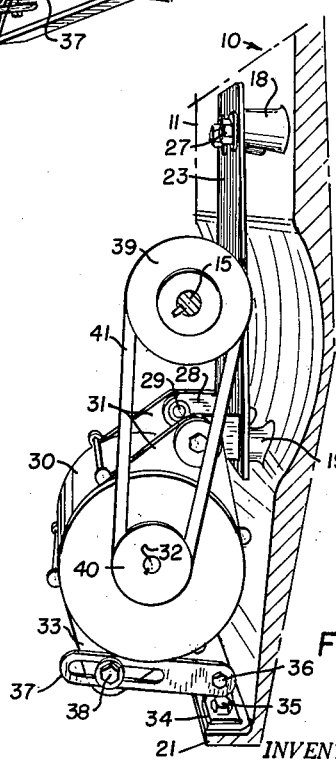
FIGURE 5 is a perspective view of the arrangement, as viewed in the opposite direction from FIG. 4 and with only fragmentary portions of the diesel engine being shown.

When the alternator is affixed to the bracket by connecting each mounting flange 31 to a bearing ear 29 by the mounting bolts, as clearly illustrated at FIGS. 3, 4 and 5, the alternator will hang downwardly from the bracket ears and will lie against the block 11 below the bracket and immediately above the base flange 21 of the block 11.

A clip angle 34 having an orifice through each leg is affixed to this base flange 21 as by a connecting bolt 35 which may be turned into a selected flange orifice 20 adjacent to the alternator adjusting flange 32, by removing the standard regular pan bolt 22 from that orifice. The upstanding leg of this clip angle holds a pivot bolt 36, which in turn holds a slotted adjusting arm 37. A lock bolt 38 connects the slotted adjusting arm with the adjusting flange 33 of the alternator by extending through the slotted portion of the adjusting arm. It follows that the tilt of the alternator in the bearing ears 28 may be adjusted by slipping the lock bolt 38 to a selected position on the slotted adjusting arm and there tightening it, as in the position clearly illustrated at FIG. 5.

The alternator 30 is operatively connected with the drive shaft 15 by a pulley-belt arrangement. This includes a drive pulley 39 which may be keyed or otherwise secured upon the drive shaft 15. It also includes a driven pulley 40 which is correspondingly affixed to the driven shaft 32 of the alternator. These pulleys are connected by a belt 41. It is to be noted that the diameters of the drive pulley 37 and the driven pulley 38 are selected to bring the alternator to a proper speed for effective generation of an alternating current when the diesel engine is idling, as hereinbefore explained.

From the foregoing description, the manner of use of the invention is apparent. Upon removing a conventional direct current generator, its mounting bracket and the coupling connecting it with the drive shaft 15, the new installation is completed by affixing the bracket 23 to the side of the engine by the bolts 27 and by connecting the clip angle 34, which carries the slotted arm 37, to the base flange of the block 21 by a bolt 35. The drive pulley 39 is then affixed to the shaft 15 and the driven pulley 40 is affixed to the alternator driving shaft 32. The alternator is then connected to the bearing ears 28 of the bracket by the mounting bolts 29. Next, the belt 41 is positioned over the pulley and the slotted adjusting arm 37 is connected to the adjusting flange 33 by the lock bolt 38. The final step is to adjust the vertical position of the mounting bracket 23 before tightening the bolts 27 into the engine block 11 and to tilt the position of the alternator in its mounting before tightening the lock bolt 38 in the slot of the arm 37, such adjustments bringing the belt to a desired tightness about the pulleys.

It is obvious that others skilled in the art can devise and build alternate and equivalent constructions which are nevertheless within the spirit and scope of the present invention and hence, I desire that my protection be limited, not by the constructions illustrated and described, but only by the proper scope of the appended claims.

I claim:
1. In combination with a diesel engine having a generator drive shaft at an outstanding housing portion at one end of the engine block for direct connection of a generator when mounted alongside the block and in axial alignment with the drive shaft, and having mounting lugs with tap holes on the engine block above and below the generator position, a mounting bracket assembly for mounting an alternator, in lieu of a generator, against the side of the engine out of position substantially below the generator position, said alternator having a cylindrical body with mounting flanges at one side thereof, and said bracket comprising a flat plate member adapted to overlay the mounting lugs, vertical slots in registration with the lug tap holes for bolting the plate to the body and for permitting vertical adjustment of the plate on the body, and outstanding ears at the base of the plate adapted to be connected with mounting flanges of the alternator to permit the alternator to hang therefrom.

2. In the combination set forth in claim 1, said engine including a base flange substantially below the generator position and said alternator including an adjuster flange diametrically opposite the mounting flange, the further improvement comprising a clip angle adapted to be affixed to the base flange, a slotted arm pivotally carried on the clip angle to outstand from the body of the motor and means for connecting the slotted arm to the alternator adjuster flange whereby to hold the alternator at a selected inclination.

3. In the combination set forth in claim 1, further elements comprising a drive pulley adapted to be mounted upon the generator drive shaft, a driven pulley on the alternator and a belt interconnecting the pulleys.

4. In the organization set forth in claim 1, the slots at the lower edge of the plate being open at the edge of the plate whereby to slide the plate in position upon bolts partially turned into the lower mounting lugs on the engine block.

5. In combination with a diesel engine, wherein the engine includes a generator drive shaft at an outstanding housing portion at one end of the engine block for direct connection to a generator when it is mounted alongside the block in axial alignment with the generator drive shaft and mounting lugs having tapped holes in the engine block above and below the generator position, the improvement consisting of, a mounting bracket assembly for mounting an alternator in lieu of the generator against the side of the engine and at a position substantially below the generator position, said alternator being formed as a cylindrical body having mounting flanges at one side thereof and an adjuster flange at the opposite side thereof, said bracket comprising a flat plate member adapted to overlay the lugs, vertical slots in registration with the tapped holes in the lugs, bolts for bolting the plates through the slots and to the body with the slots permitting vertical adjustment of the plate on its lugs, outstanding ears at the base of the plate adapted to connect with the mounting flanges on the alternator to permit the alternator to pivotally depend from the ears, a clip angle adapted to be mounted upon the engine body below the suspended alternator position having an outstanding slotted arm adapted to connect the adjuster flange on the alternator to affix the alternator at a selected inclination.

6. In the organization set forth in claim 5, a drive pulley mounted upon the generator drive shaft a driven pulley mounted upon the alternator a belt interconnecting the pulleys.

7. In the organization set forth in claim 5, said slotted arm being affixed to the adjuster flange by a bolt whereby to permit shiftable adjustment thereof.

References Cited in the file of this patent
UNITED STATES PATENTS
1,191,624    Stevens ---------------- July 18, 1916